United States Patent Office 3,175,716
Patented Mar. 30, 1965

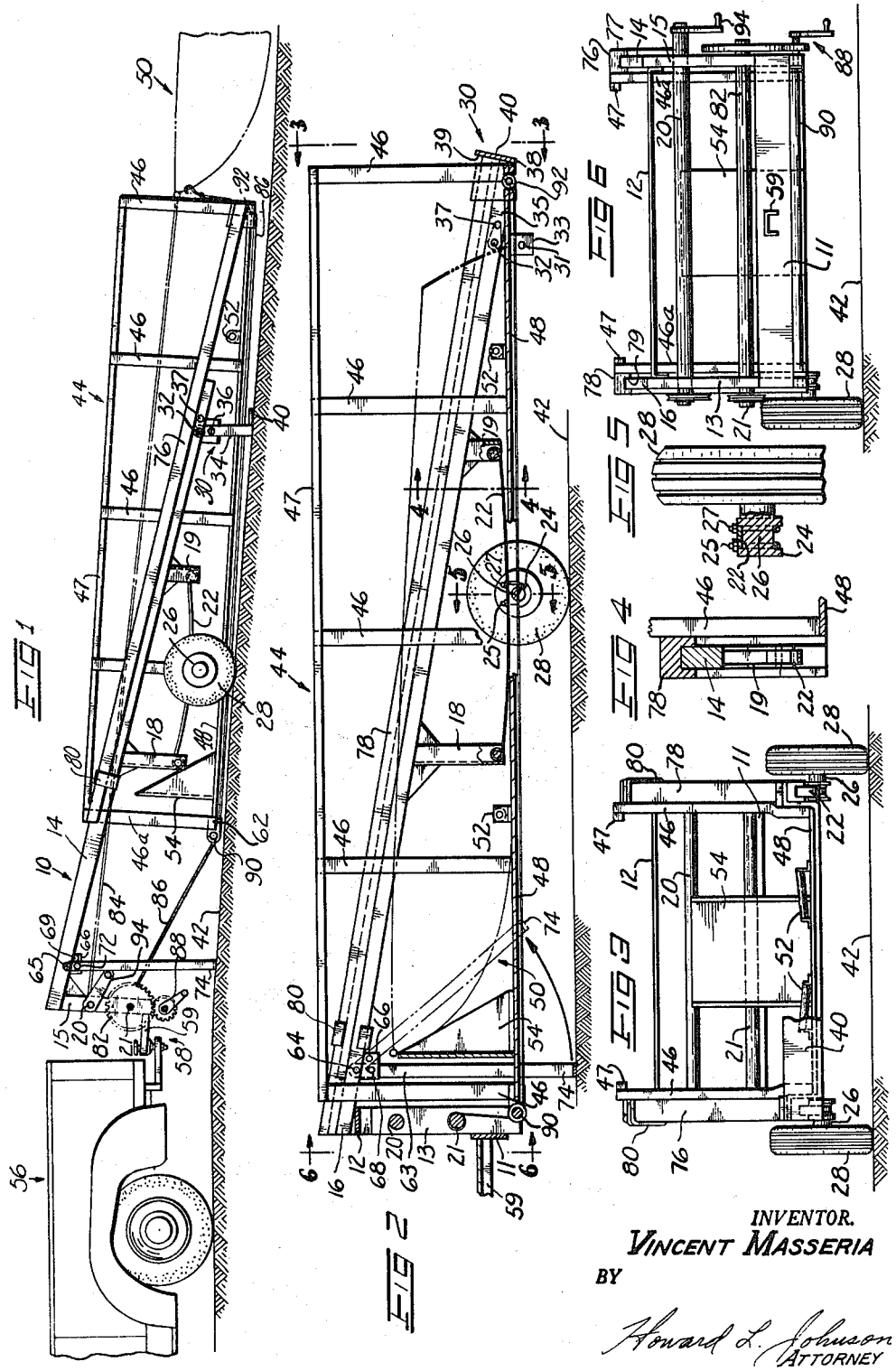

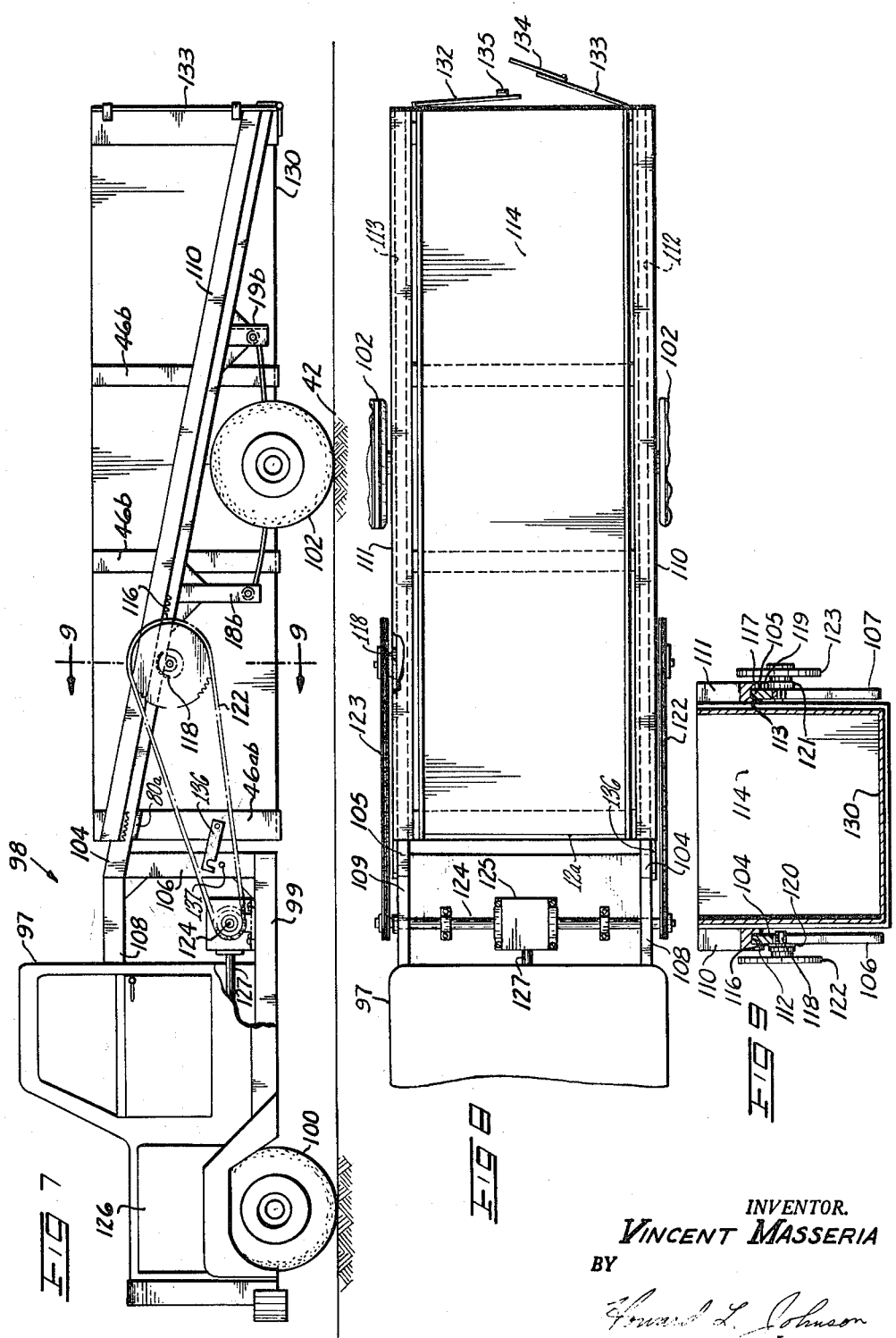

3,175,716
WHEELED CARGO-CARRYING VEHICLES
Vincent Masseria, 3311 W. 139th St., Hawthorne, Calif.
Filed May 17, 1961, Ser. No. 110,787
11 Claims. (Cl. 214—512)

This invention relates to cargo-carrying vehicles, whether of the self-propelled type (as highway trucks) or towed units (as auto trailers and railway cars). In particular it is directed to a novel construction (which may be embodied in such wheeled vehicles) wherein the entire cargo-supporting body or horizontally mounted pallet is disposable alternately between a ground level—for loading—and an elevated or normal travelling position.

By such arrangement, the entire flat-bottomed cargo area of a truck or trailer, for example, can be loaded and unloaded at ground level, as by carrying, pushing or pulling the transport articles by hand if not too heavy, or otherwise by any available means of handling cargo on the level, so that no additional facilities (or manual effort) need be resorted to for raising or lowering the cargo pieces between ground level and transport level. In addition, if a loading dock is available at transport level, cargo may be shifted directly to or from the dock to the elevated carrier body of the vehicle at either or both ends of a journey. Further, the power unit (such as the vehicle motor) employed to raise the cargo body relative to the vehicle may also be used to draw the cargo into and out of the cargo body at either level (aided by rollers if desired).

The persistent problems presented by operating at two different levels in loading and unloading cargo are evident to all. Many attempts to deal with the situation have ranged from erecting railway loading docks at railroad car level, to mounting elevator tail-gates on delivery trucks. In the first case, the problem remains of initially getting the cargo up to the loading dock level (which might be done by erecting ramps alongside the dock—but this serves only such cargo as initially located nearby). Alternately, using an elevator tail-gate or analogous hoist limits the result to step-wise movement of one small article at a time, while still requiring special equipment to accomplish this.

Accordingly it is an object of the present invention to provide a truck or trailer having its entire cargo area vertically movable as a unit and without tilting, so that the whole cargo can be loaded and unloaded on a walk-in level. Alternate to ground level, such walk-in level may be the elevated, or transport level alignable with an elevated loading dock (including that of another truck or railroad car).

Another purpose is to provide such a mounted cargo body constructed as a part of a wheeled vehicle wherein the permanently-horizontally disposed cargo body is mounted for inclined movement between ground level and transport level, in a highly stable manner, and readily activated by self-contained mechanism actuated by propulsion means of the vehicle, if desired.

Still another object resides in the provision of such an elevatable cargo body in association with a vehicle chassis carrying separately mounted rear wheels between which the cargo body may be dropped to ground level for loading.

Yet another purpose is to provide an improved boat trailer embodying the present invention, which accordingly is adapted to load and discharge a boat to and from a body of water without risking the wheels of the towing vehicle in the water, often without even exposing the trailer wheels to the water level of a beach.

Other objects and advantages will become apparent as the description proceeds, having particular reference to the accompanying drawings depicting presently preferred embodiments of the invention wherein:

FIGURE 1 is a side elevational view of a boat trailer constructed according to my invention, shown on a sloping beach with the cargo carrier in lowered position for drawing a boat (indicated in phantom) into the cargo space from the water, and with a towing vehicle seen (in part) attached to the forward end of the trailer;

FIGURE 2 is a vertical, longitudinal sectional view of the trailer, with the cargo carrier in elevated position and the raised tail-gate disposed in locked position;

FIGURE 3 is an end elevational view of the trailer as seen along the line 3—3 of FIGURE 2 with part of the tail gate broken away;

FIGURE 4 is a construction detail showing the attachment of the suspension spring to the trailer frame as viewed along the line 4—4 of FIGURE 2;

FIGURE 5 is a transverse vertical section taken thru the wheel mount along the line 5—5 of FIGURE 2;

FIGURE 6 is an end elevational view of the trailer taken along the line 6—6 of FIGURE 2 with the tow bar in vertical section;

FIGURE 7 is a side elevational view of a self-propelled highway vehicle having the cargo space or truck body constructed according to the present invention, with a portion of the cab broken away;

FIGURE 8 is a top plan view of the truck body of FIGURE 7;

FIGURE 9 is a vertical sectional view taken thru the truck body along the line 9—9 of FIGURE 7.

As here illustrated, there is provided a generally rectangular, open-bottomed frame 10, appearing U-shaped in plan and incompletely triangular in side elevation, with what is usually the lead end of the vehicle formed by a pair of cross members, the upper 12 being horizontally disposed and the lower 11 being a vertical plate. Vertically separated between the two cross members are a pair of transverse pulley shafts 20, 21. The cross members are secured between a pair of uprights 13, 15 which journal the shafts 20, 21 and form part of parallel side walls, the upper edges of which sides are constituted by straight, rearwardly descending transversely aligned rails 14, 16. Intermediate the length of each side rail is a vertically descending pair of suspension arms 18, 19 of unequal length which jointly support an approximately horizontally disposed, spring member 22. Intermediate the length of the spring, an axle housing 24 is dependently suspended with a stub shaft 26 fastened to the leaf spring 22 by a pair of U-bolts 25, 27. A free-rolling wheel 28 (i.e. not a drive wheel) is carried on the shaft 26. In particular, it will be noted that the opposite trailer wheels are not mounted on a common axle extending between them, since it is essential that this intervening space be open or unoccupied for (inclined) vertical movement of the always horizontally-disposed cargo body therein, as will be shortly described.

At the rear ends, the side rails 14, 16 are transversely connected by a tail gate 30, pivotly attached at 32 some distance anterior to each rail end, and formed of a parallel pair of L-shaped side arms 34, 35, with the vertical portion disposable in juxtaposition with the outer vertical face of the rail (14 or 16) and the other arm of the "L" underlying the rail, being selectively locked in such "closed" position by insertion of a retractable pin or the like (not shown) thru thus aligned apertures 36, 37 (FIG. 1). The distal ends of the side arms 34, 35 are connected by a cross plate or footing member 38 which after the side arms are swung "up," has its upper face 39 disposed approximately vertically, in abutment with the ends of the side rails 14, 16; when the side arms 34, 35 are allowed to drop down arcuately, the opposite or under face 40 of the cross plate is disposed in abutment with the ground or street surface 42 so as to provide a firm vertical support for the rear of the frame 10. Again, it will be apparent that the distal ends of the side rails 14, 16, at this their lowest point of permanent elevation from the ground 42, are not directly cross-connected, but like the transverse space between the two stub axles 26, the cargo body can move up and down within this open span (as well as longitudinally). Arms 34, 35 are fixed in up or down position by a locking pin (not shown) inserted jointly thru aperture 36 plus 31 or 37.

For added ground support of the parked frame, as when the frame 10 is a severable unit such as a highway trailer intended to be coupled to a towing vehicle 56 by a conventional trailer hitch 58 and tow bar 59, there is provided a vertically disposable, generally U-shaped brace or mount, of which the support arms 62, 63 have their free ends pivotally connected to the outer face of the rails 14, 16 at 64, 65. An attachment plate 66 fixed to the respective rail is formed with two other transverse apertures 68, 69 to receive a locking pin or the like inserted jointly thru an alignable aperture 72 in the arm 62 or 63. The arms 62, 63 are jointly connected by a contact rod 74 disposed beneath the frame 10 and movable laterally (by means of the support arms 62, 63) in the longitudinal direction of the frame between a ground abutment position (FIG. 2) wherein the arms 62, 63 are upright (and the carrier body 44 may be either up or down within the frame), and an upswung position locked by pins thru apertures 69 (indicated in phantom, FIG. 2) in contact with the bottom of the elevated carrier body, in which position the frame and carrier may be moved along a road supported only by the wheels 28. Thus, when parked, the trailer frame 10 may be supported from the ground at three places along its length, namely, the contact rod 74, the wheels 28, and the lowered tail gate 30.

Horizontally disposed between the parallel side arms 14, 16 of the frame, is a longitudinally moveable carrier body 44 constructed of upright side members 46 (located closely adjacent the inner faces of the respective side arms 14, 16) topped by elongated, horizontal guard rails 47 and connected by a pallet of transverse floor members 48 (which may or may not form a continuous flat surface). When the carrier body is particularly designed to transport a boat 50, the floor members may include or consist of angularly directed (usually jointly V-shaped) rollers 52. Across the forward or lead end of the carrier is mounted a transverse anchor or attachment post 54 or similar upright wall serving as a barrier for cargo rolled or carried into the carrier from the opposite end, and to which a rollable object like a boat (or other cargo mounted on a caster or dolly) can then be tied or otherwise secured.

The carrier body 44 is rigidly fixed along each outer side to a parallel pair of inclined, slide rails 76, 78 which are slidably disposed overlying the top of the respective fixed rails 14, 16 of the frame (of generally similar length) by means of a downward-opening longitudinal channel 77, 79, also being held against separation from the supporting rails by metal clasps or straps 80 which slidingly grasp the particular slide rails 76, 78 and thus move lengthwise along the supporting fixed rail 14, 16 for the limit of possible travel. When the slide rails 76, 78 accordingly overlie the entire length of the fixed rails 14, 16 the thus supported carrier body 44 is in its elevated or transport position for movement along a path or roadway by the wheeled frame 10. When the upper rails 76, 78 are allowed to slide down (by gravity) approximately one fourth their length along the lower rails 14, 16, the bottom of the carrier 44 then rests flatly upon the level ground so that articles (including the boat 50) can be moved into and out of the cargo space at "street level."

To assist in loading and unloading, as well as to elevate the carrier 44 within the frame 10, a winch 82 is provided which may be motor driven from the towing vehicle 56, as well as being capable of independent operation when the trailer (10) is separated therefrom. Secured to the winch is a draw cable 86 which passes under a forward pulley 90 and thence beneath the carrier body 44 to a rear roller 92. When fastened to the shaft of this roller 92, the cable 86 is used to draw the body 44 to its elevated position within the frame 10 (by movement of the slide rails 76, 78 along the fixed rails 14, 16). Upon detachment from the roller 92, the cable 86 can be secured to the forward end of cargo within the carrier body (such as the boat 50 FIG. 2), and used to draw it out from the supporting pallet 48 or carrier body. By means of the hand crank and connected gearing 88, the winch can be manually operated for both purposes. By means of another hand crank 94 on the upper, forward pulley shaft 20, a second cable 84 detachably secured directly to cargo articles is used to draw them into the cargo space, usually by their placement upon casters or rollers but also by simply sliding the article (such as a flat-bottomed container) across the pallet 48. This cable 84 can thus be attached to a boat 50 while it is still in the water (FIG. 1) and used both to guide and draw it into the lowered carrier body 44. Or again, the elevated carrier can be loaded in like manner from a railroad car or loading dock by using the cable 84 to pull cargo pieces onto the pallet 48. Unloading by use of the lower cable 86 can also be effected with the pallet 48 at either elevated or lowered position as long as the surface to which the cargo is delivered is also at the same (approximate) level.

In FIGURES 7, 8, 9 the invention is shown embodied in a self-propelled vehicle, namely a front-wheel-drive truck 98. The front (steering) wheels 100 are the drive wheels, while as before the rear, separately mounted wheels 102 are free rolling. Posterior to the cab 97, the chassis 99 includes a parallel pair of rearwardly descending, fixed rails 104, 105, laterally spaced apart and supported by uprights 106, 107 and horizontal braces 108, 12a, 109. A parallel pair of slide rails 110, 111 having longitudinal, bottom-opening channels 112, 113 overlie the fixed rails and support between their inner faces a flat-bottomed, open-topped, cargo body 114 of generally rectangular shape.

Along the lower edge of the outer face of each slide rail 110, 111 laterally adjacent the respective fixed rail 104, 105 is a dependent or downwardly directed, toothed portion or rack 116, 117 which articulates with a pinion gear 118, 119. The bearing mounts 120, 121 for the pinion gears are secured to the underfaces of the respective fixed rails and the gears are operated by belt drives 122, 123 from a cross shaft 124 out of a gear box 125 disposed atop the chassis 99 and connected to the truck motor 126 by a drive shaft 127. Accordingly, the carrier body or cargo space 114 can be operated by the drive shaft 127 from the truck engine 126, being thus moved between lowered (loading) and elevated (transport) positions, by reason of the slide rails 110, 111 moving longitudinally partway along the fixed rails 104, 105, as in the construction of the separate trailer of FIGS. 1–6.

As in the prior form, when the cargo body 114 is in lowered position, its flat bottom 130 rests on the level street or ground 42, and by opening the laterally swinging gates 132, 133, personnel can walk in and out of the cargo body 114 carrying or pushing articles being loaded or unloaded. A drop-bar 134 and an open-top, latch channel 135 serve to fasten the gates together when closed. Locking means 136, 137 are also provided to secure the elevated body 114 to the chassis 99.

I claim:

1. A cargo carrying assembly comprising in combination: a generally rectangular frame having an open bottom and generally parallel side walls transversely connected across one end above their lower margins, a support wheel dependently carried by each side wall, such pair of wheels accordingly being laterally spaced apart approximately the width of said frame, each of said side walls including a mutually parallel, longitudinal fixed rail, downwardly slanted from said cross-connected end and extending substantially along the length of the frame; a generally rectangular carrier body nested within said frame and longitudinally slidable toward and away from said cross-connected end, said body being formed with upright side members, transverse floor members, and opposing slide elements suspending said nested body within the frame from the respective fixed rails for longitudinal movement within said frame between a loading position wherein said body floor members are disposed adjacent the ground between said wheels and an elevated position for movement of the assembly on said wheels; locking means adapted selectively to secure the body at said elevated position; and means for moving said body along said longitudinally slanted rails between loading and elevated positions within the frame.

2. The assembly of the preceding claim 1 which additionally has coupling means adjacent said cross-connected end for attachment to a towing vehicle.

3. The assembly of the preceding claim 1 wherein said frame forms part of a self-propelled vehicle.

4. The assembly of the preceding claim 1 which has reciprocable means adapted to move cargo in and out of said body when in loading position.

5. The assembly of the preceding claim 1 wherein said body moving means are adapted to move cargo in and out of said body when in loading position.

6. The assembly of the preceding claim 1 wherein said fixed rails and slide elements are approximately coequal length and are provided with stop means whereby relative longitudinal movement thereof is limited to a minor portion of their length.

7. The assembly of the preceding claim 1 wherein said body floor members include a longitudinal series of roller means adapted to support a boat within said body.

8. The assembly of the preceding claim 1 wherein said body floor members form a substantially flat, horizontally disposed cargo pallet.

9. The assembly of the preceding claim 1 wherein said locking means include a tail gate comprising a cross member adapted to be transversely disposed jointly adjacent the end of said frame which is opposite said cross-connected end and adjacent said carrier body when the latter is in elevated position, a generally perpendicular, mutually parallel and laterally separated pair of side arms each fixed at one end to an extremity of said cross member and having their other end pivotally secured to an outer face of a side wall of said frame at a point of horizontal displacement from said end approximating its vertical distance from the ground, whereby said tail gate may be swung arcuately downward from said position of end registration to a frame-supporting, ground abutment position adapted to have said carrier body disposed thereupon when in loading position.

10. The assembly of the preceding claim 1 wherein said cooperating fixed rails and slide elements jointly carry rack and pinion mechanism adapted for effecting relative longitudinal movement thereof.

11. A cargo carrying assembly adapted to be detachably coupled to a towing vehicle and comprising in combination: a generally rectangular frame having an open bottom and generally parallel side walls transversely connected across one end above their lower margins, a support wheel dependently carried by each side wall, such pair of wheels accordingly being laterally spaced apart approximately the width of said frame, each of said side walls including a mutually parallel, longitudinal fixed rail, downwardly slanted from said cross-connected end and extending substantially along the length of the frame; and a generally U-shaped ground support element having its upper ends pivotally secured to said frame adjacent said cross-connected end, and a ground contact rod disposed beneath the frame and arcuately swingable between a ground engaging position for stationary support of the frame and an upswung position adjacent the undersurface of the frame permitting wheeled movement of the assembly; a generally rectangular carrier body nested within said frame and including a pair of slide rails of generally co-equal length to said fixed rails each formed with a downward opening channel in which one of said fixed rails is slidingly received so as to permit longitudinal movement of the respective slide rail therealong for a minor portion of its length toward and away from said cross-connected end, said body being formed with upright side members, and transverse cargo-supporting floor members, whereby said nested body is mounted upon the respective fixed rails for longitudinal movement within said frame between a loading position wherein said body floor members are disposed adjacent the ground between said wheels and an elevated position for movement of the assembly on said wheels; a tail gate comprising a cross member adapted to be transversely disposed jointly adjacent the end of said frame which is opposite said cross-connected end and adjacent said carrier body when the latter is in elevated position, a generally perpendicular, mutually parallel and laterally separated pair of side arms each fixed at one end to an extremity of said cross member and having their other end pivotally secured to an outer face of a side wall of said frame at a point of horizontal displacement from said end approximating its vertical distance from the ground, whereby said tail gate may be swung arcuately downward from said position of end registration to a frame-supporting, ground abutment position adapted to have said carrier body disposed thereupon when in loading position, locking means adapted selectively to secure the body at said elevated position; and means for moving said body along said longitudinally slanted rails between loading and elevated positions within the frame and for drawing cargo in and out of said carrier body when on a level therewith.

References Cited in the file of this patent

UNITED STATES PATENTS

| 2,044,592 | Richards | June 16, 1936 |
| 2,693,288 | Black | Nov. 2, 1954 |
| 2,821,315 | Bucher | Jan. 28, 1958 |
| 3,024,931 | Grover et al. | Mar. 13, 1962 |

FOREIGN PATENTS

| 243,628 | Great Britain | Dec. 3, 1925 |
| 577,924 | Great Britain | June 5, 1946 |